April 1, 1924.
H. L. WIRT
CLEARANCE MEASURING DEVICE
Filed Dec. 18, 1922
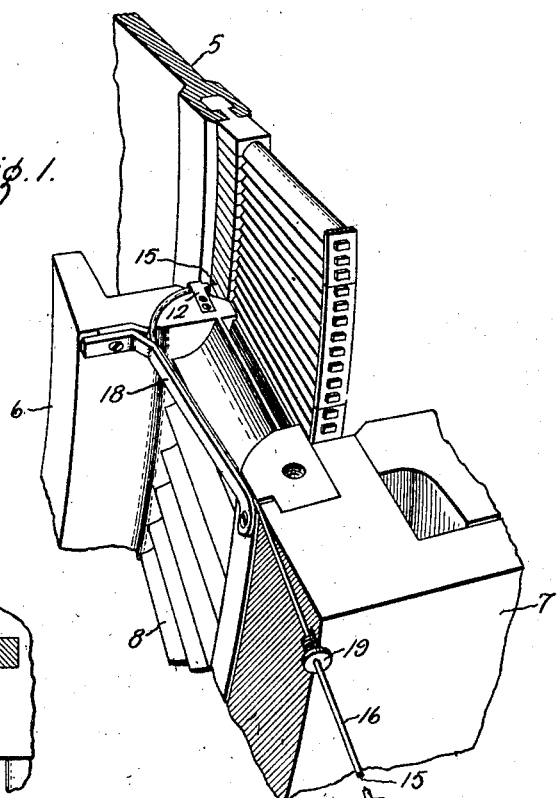
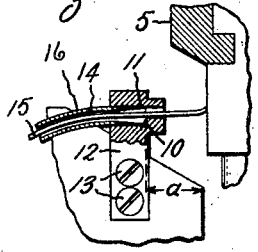
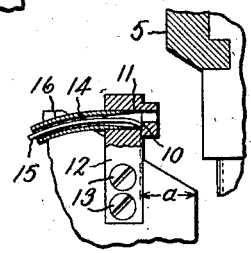
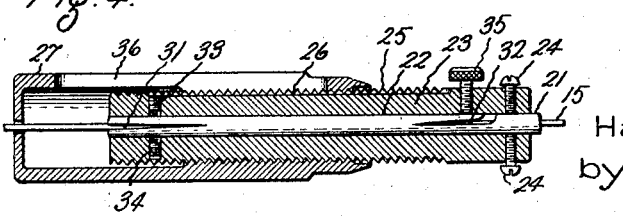
Inventor:
Harrison L. Wirt,
by
His Attorney.

Patented Apr. 1, 1924.

1,488,968

UNITED STATES PATENT OFFICE.

HARRISON L. WIRT, OF SCHENECTADY, NEW YORK, ASSIGNOR TO GENERAL ELECTRIC COMPANY, A CORPORATION OF NEW YORK.

CLEARANCE-MEASURING DEVICE.

Application filed December 18, 1922. Serial No. 607,484.

*To all whom it may concern:*

Be it known that I, HARRISON L. WIRT, a citizen of the United States, residing at Schenectady, in the county of Schenectady, State of New York, have invented certain new and useful Improvements in Clearance-Measuring Devices, of which the following is a specification.

The present invention relates to measuring devices for use in measuring small distances in ordinarily inaccessible places in the interior of machines, the object of the invention being to provide an improved apparatus by means of which the positions of two parts relatively to each other may be determined even though the adjacent surfaces of the parts are quite inaccessible. It is well adapted for measuring the clearance between two parts in a machine one of which is fixed and the other liable to move relatively thereto, the latter being either a normally stationary part or a moving part of the machine.

An application of my invention is in connection with elastic fluid turbines for measuring the positions of diaphragms to determine deflection under load and for measuring the clearance between a rotor element and an adjacent stationary wall and in the drawing and following specification I have specifically illustrated and described my invention as applied to an elastic fluid turbine. It will be understood, however, that this is only by way of example and that my invention may be used in connection with other machines.

For a consideration of what I believe to be novel and my invention, attention is directed to the accompanying description and the claims appended thereto.

In the drawing, Fig. 1 is a perspective view showing my improved clearance measuring device applied to an elastic fluid turbine; Figs. 2 and 3 are detail views illustrating the manner in which the device is used, and Fig. 4 is a sectional view of a part of the device.

Referring to the drawing, 5 indicates a rotor element of an elastic fluid turbine, here shown in the form of a bucket wheel and 6 indicates an adjacent stationary element which is in the form of a nozzle diaphragm carried in the shell or casing 7 of the turbine, the nozzles being indicated at 8. The instrument is shown as being used to measure the clearance in an axial direction between the bucket wheel and the diaphragm.

According to my invention I provide on the stationary element a means which forms an abutment or stop 10 which abutment or stop is a known, fixed distance from an edge of the diaphragm. That is the distance *a* for example, (Fig. 2) is known. The abutment or stop 10 with advantage may be formed at one side of a hole 11 in a plate 12 fastened to the diaphragm by screws 13. Extending from stop 10 to the outside of the turbine casing is means forming a passage 14 through which a measuring wire 15 may be passed. In the present instance passage 14 is formed by a tube 16 having its inner end fastened in hole 11 and its outer end fastened in one arm of a U-shaped frame 17. Tube 16 is supported by a suitable brace 18. At the point where tube 16 passes through shell 7 is a stuffing box 19 and at its end is a stuffing box 20, such boxes serving to prevent leakage of elastic fluid.

Fixed in the other arm of frame 17 is a tube 21 which extends through an axial opening 22 in a micrometer head 23 and is fastened therein by set screws 24. Micrometer head 23 is threaded on its outer surface as indicated at 25, the threads being interrupted to provide a flat surface 26 which carries a micrometer scale. On micrometer head 23 is a micrometer sleeve 27 provided with a scale 28 which cooperates with the scale on surface 26. Measuring wire 15 extends through tube 21 and a hole in the end of sleeve 27 and on its end is provided with a fixed stop or abutment 29 here shown in the form of a knob fastened to the wire by a set screw 30. Tube 21 is slotted longitudinally as indicated at 31 and 32 and by screwing down any one of the set screws 33, 34 or 35, the tube can be made to grip tightly wire 15. In sleeve 27 is a slot 36 to give access to set screws 33 and 34. I provide slots 31 and 32 and the plurality of set screws as a matter of convenience and either slot may be omitted if desired. Slot 32 and set screws 35 are the more handy to use because screw 35 is more readily accessible, while slot 31 and set screws 33 and 34 while not quite so handy are more dependable for accuracy, being nearer the outer end of the wire.

In the use of the device for measuring clearance, the wire 15 is first pushed through tube 16 and hole 11 until its end comes into contact with the adjacent surface of the rotor element as illustrated in Fig. 2. Contact can be heard on the outside by listening with the ear against the knob 29 and this forms usually the best method for determining it, although any other suitable way may be utilized. Set screws 33 or 34 or set screw 35 is then tightened to clamp the wire to tube 21. Micrometer sleeve 27 is then screwed back until it comes into contact with knob 29 and the micrometer is read. The set screw 33, 34 or 35 is then loosened and wire 15 is pulled out and brought into engagement with abutment 10 as illustrated in Fig. 3, after which one of the set screws is again tightened to clamp the micrometer head to the wire. Knob 29 is then a distance from the end of micrometer sleeve 27 equal to the distance between abutment 10 and the adjacent moving surface with which the end of the wire was in contact and this distance is measured by the micrometer by again screwing sleeve 27 back until it strikes knob 29 and taking the difference between its then reading and its former reading. This gives the actual distance at the time the measurement is made between abutment 10 and the moving element and since the distance between the abutment and the adjacent surface of the stationary element is already known, the difference between these two distances is the clearance, the thing it is desired to determine.

To obtain the most accurate results it is desirable to take the wheel measurement first and then the stop measurement as this eliminates the effect of wearing off of the end of the wire when in engagement with the wheel. The effect of temperature changing the length of the wire appreciably while a measurement is being made is eliminated by having the stop as close to the wheel surface as possible and by taking the second reading as soon as possible after the first reading.

Wire 15 is provided preferably with a kink or slight bend at its inner end so that when turned one way its end is opposite hole 11 and it will slide readily through hole 11 while when turned the other way it is opposite and will strike abutment 10.

The means forming stop or abutment 10 and that forming passage 14 are a permanent part of the turbine structure and may be provided at whatever points it is desired to measure the clearance. The remaining portion of the apparatus may be detachable or not as found desirable in any particular case. In connection with an elastic fluid turbine I may install a complete device as shown in Fig. 1 of the drawings, at each point it may be desired to measure the clearance.

My clearance measuring device is simple in structure, easy to use and can be supplied at a low cost. In addition it is very accurate being easily manipulated to obtain clearance measurements accurate to within one thousandth of an inch.

Also it can be used at any time when the machine is running which is a thing of great importance in many instances. For example, in the case of an elastic fluid turbine it enables the operator to determine the amount the clearances are impaired due to expansion or other causes when the machine is under load.

My invention has also the further advantages that the tube 16 may be curved to avoid obstructions and the measurements may be taken in any desired direction independent of the direction in which the tube is lead into the interior of a machine, it being only necessary to curve the inner end of the tube to point in the desired direction. Since the measuring wire is flexible it will follow readily the direction given it by the tube.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. The combination with a fixed part and an adjacent part liable to movement relatively to the fixed part, adjacent surfaces of said parts being not readily accessible, of a stationary abutment on the fixed part having a surface located a known distance from a surface of the fixed part and facing in the opposite direction, and means for measuring from a point outside the fixed part the distance between said stationary abutment surface and a surface of the movable part, said means comprising a member which is moved successively into engagement with said surface of the movable part and said abutment, and means for indicating the distance said member is moved in being shifted from one to the other.

2. The combination with a fixed part and an adjacent part liable to movement relatively to the fixed part, of an abutment on the fixed part having a surface located a known distance from a surface of the fixed part, a measuring wire, means forming a guide for the measuring wire for directing its end to either the abutment or to a surface of the movable part, and means for measuring the distance the wire is moved in moving its end from engagement with the movable part to engagement with the abutment.

3. The combination with a fixed part and a second part having relatively inaccessible adjacent surfaces, of means for measuring the clearance between said surfaces comprising a stationary abutment on the fixed part located a known distance from and facing in a direction opposite to the adjacent surface of the fixed part, and means for measuring the distance between said stationary abutment and the adjacent surface of the second part, said means comprising a member which is moved successively into engagement with said surface of the second part and said abutment, and means for indicating the distance said member is moved in being shifted from one to the other.

4. The combination with a fixed part and a second part having relatively inaccessible adjacent surfaces, of means for measuring the clearance between said surfaces comprising a stationary abutment on the fixed part located a known distance from and facing in a direction opposite to the adjacent surface of the fixed part, and means for measuring the distance between said stationary abutment and the adjacent surface of the second part, said means comprising a member adapted to be moved successively into engagement with the adjacent surface of the second part and into engagement with the stationary abutment, and means for measuring the distance it is moved in being moved from one to the other.

5. The combination with a fixed part and a second part having adjacent surfaces, of means for measuring the clearance between said surfaces comprising an abutment on the fixed part located a known distance from the adjacent surface of the fixed part, and means for measuring the distance between said abutment and the adjacent surface of the second part, said means comprising a member adapted to be moved into engagement with the adjacent surface of the second part and into engagement with the abutment, and a micrometer associated with said member and relatively to which it is moved for measuring the movement required to bring the member from engagement with the second member into engagement with the abutment.

6. The combination with a casing and a movable member therein of means for measuring the clearance between adjacent surfaces of the casing and movable member, said means comprising an abutment on the casing, means forming a passage leading from outside said casing to the abutment and to the adjacent surface of the movable member, a wire in said passage which wire may be moved to bring its inner end into engagement with either the abutment or the adjacent surface of the movable member, and means outside said casing for measuring the distance the wire is moved.

7. The combination with two members having adjacent surfaces, of means for measuring the clearance between said surfaces comprising an abutment on one of said members, a wire, the inner end of which is adapted to be moved into engagement with either the other member or the abutment, a micrometer head through which the outer end of the wire extends, means for clamping the head to the wire, a micrometer sleeve, and a stop fixed on the end of the wire beyond said sleeve.

8. The combination with a casing and a movable member therein, of means for measuring the clearance between adjacent surfaces of the casing and movable member, said means comprising an abutment on the casing, means forming a passage leading from outside said casing to the abutment and to the adjacent surface of the movable member, a wire in said passage, which wire may be moved to bring its inner end into engagement with either the abutment or the adjacent surface of the movable member, a micrometer head through which the outer end of the wire extends, means for clamping the head to the wire, a micrometer sleeve, and a stop fixed on the end of the wire beyond said sleeve.

9. The combination with a fixed part and an adjacent part the position of which may change relatively to the fixed part of means for measuring the clearance between said parts, said means comprising an abutment on the fixed part located a known distance from a surface of the fixed part, means forming a curved passage way through the fixed part, a flexible member which slides in the curved passageway, means for directing the end of the flexible member to either the abutment or to a surface of the adjacent part, and means for measuring the distance the flexible member is moved in moving from such surface to the abutment.

10. An apparatus for measuring the clearance between surfaces of adjacent parts characterized by the fact that one of the parts is provided with a passageway and a stop and that a flexible wire is entered through the passageway for measuring the distance between the stop and an adjacent surface of the other part whereby by reason of the flexible wire distances at a direction other than that of the entering direction of the passageway may be measured.

11. The combination with a casing having a passageway which may extend in other than a straight direction and a part in the casing, of a stop near the inner end of the passageway, an exit hole at the end of the passageway, and a flexible wire which slides in said passageway, and may be twisted to bring its inner end into engagement with the stop or in line with the exit hole so it may be pushed through the exit hole into engagement with said parts.

In witness whereof, I have hereunto set my hand this 15th day of December, 1922.

HARRISON L. WIRT.